US007782337B1

(12) United States Patent
Zimmer et al.

(10) Patent No.: US 7,782,337 B1
(45) Date of Patent: Aug. 24, 2010

(54) MULTI-CONIC GRADIENT GENERATION

(75) Inventors: Mark Zimmer, Aptos, CA (US); Ralph Brunner, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 333 days.

(21) Appl. No.: 11/862,547

(22) Filed: Sep. 27, 2007

Related U.S. Application Data

(63) Continuation of application No. 11/113,658, filed on Apr. 25, 2005, now Pat. No. 7,289,127.

(51) Int. Cl.
*G09G 5/00* (2006.01)
*G09G 5/02* (2006.01)
*G06K 9/00* (2006.01)
*G06K 9/32* (2006.01)
*G06T 17/00* (2006.01)
*H04N 1/46* (2006.01)
*G03F 3/08* (2006.01)

(52) U.S. Cl. .................. 345/589; 345/428; 345/586; 345/643; 345/606; 358/461; 358/525; 382/254; 382/274; 382/300; 708/503

(58) Field of Classification Search .............. 708/3, 708/7, 174, 490, 501, 503, 505; 345/426, 345/428, 586, 589, 615, 618, 619, 630, 643, 345/473; 358/518, 521, 525, 533, 447, 461, 358/463; 382/254, 274, 276, 300
See application file for complete search history.

(56) References Cited

U.S. PATENT DOCUMENTS

| 6,178,223 | B1 * | 1/2001 | Solomon et al. | 378/62 |
| 6,757,442 | B1 * | 6/2004 | Avinash | 382/274 |
| 2003/0097069 | A1 * | 5/2003 | Avinash et al. | 600/447 |
| 2005/0147314 | A1 * | 7/2005 | Kokemohr | 382/260 |
| 2005/0275733 | A1 * | 12/2005 | Chao | 348/239 |
| 2006/0233455 | A1 * | 10/2006 | Cheng et al. | 382/274 |

\* cited by examiner

*Primary Examiner*—Wesner Sajous
(74) *Attorney, Agent, or Firm*—Wong, Cabello, Lutsch, Rutherford & Brucculeri LLP

(57) ABSTRACT

Disclosed herein is a technique for computing a complex gradient using multiple conics. In connection with a computer system having a graphics processing unit (GPU) in addition to the normal central processing unit (CPU), gradients can be computed in real time. The conics may be rendered and adjusted in a number of ways, providing a rich palette for creation of gradient graphics. The computational efficiency of the algorithms disclosed herein, when executed on typical GPU hardware, allows rendering frame rates high enough to provide animated gradient images.

20 Claims, 3 Drawing Sheets

MULTI-CONIC GRADIENT GENERATION

CROSS REFERENCE TO RELATED APPLICATIONS

This application is a continuation application of co-pending application Ser. No. 11/113,658, filed on Apr. 25, 2005.

The subject matter of the present invention is generally related to the following jointly owned and co-pending patent applications, each of which is hereby incorporated by reference in its entirety:

"System for Reducing the Number of Programs Necessary to Render an Image," by John Harper, Ser. No. 10/826,773, filed Apr. 16, 2004;

"System for Optimizing Graphics for Operations," by John Harper, Ralph Brunner, Peter Graffagnino, and Mark Zimmer, Ser. No. 10/825,694, filed Apr. 16, 2004; and "High Level Program Interface for Graphics Operations," by John Harper, Ralph Brunner, Peter Graffagnino, and Mark Zimmer, Ser. No. 10/826,762, filed Apr. 16, 2004.

BACKGROUND

The present disclosure relates to the field of computer graphics processing. Particularly disclosed herein is a method and system for generating complex gradients using multiple conics in real time.

As used herein, a "gradient" is an arrangement of shading, i.e., variation of color, typically along some geometric curve. An example of one such gradient is illustrated in FIG. 1. Such gradients are used in a variety of applications, including backgrounds and screen savers for personal computers and on-air graphics and backgrounds for television programs, etc. One drawback is that historically it has been difficult to produce interesting, i.e., attractive, visually pleasing gradients. Often designers resort to using complex image editing software packages, such as Adobe Photoshop, to virtually airbrush the images, essentially hand-rendering the images. This process is obviously quite involved and time consuming, and has limited the usability of such gradients.

Furthermore, it would be desirable to be able to animate gradients for applications such as computer screen savers and/or on-air graphics. Historically, complicated animation packages have been required to produce moving gradient renderings. The complexity, availability, and obscurity of these software packages have limited the widespread adoption of such systems because many graphic designers lack the computer expertise to use them effectively.

Additionally, computer system resources, coupled with the complexity of rendering such gradients have prohibited real time rendering of such images. In the few applications where gradients could be computed in real time, system limitations have effectively limited real time systems to one gradient at a time. This provides a substantial limitation to the graphic designer and therefore limited the applicability of gradients. It would be desirable to have real time systems capable of processing multiple gradients concurrently.

Therefore, what is needed in the art, is a solution to the aforementioned problems of gradient generation.

SUMMARY

Disclosed herein is a technique for computing a complex gradient using multiple conics. In connection with a computer system having a graphics processing unit (GPU) in addition to the normal central processing unit (CPU), gradients can be computed in real time. The conics may be rendered and adjusted in a number of ways, providing a rich palette for creation of gradient graphics. The computational efficiency of the algorithms disclosed herein, when executed on typical GPU hardware, allows rendering frame rates high enough to provide animated gradient images.

DETAILED DESCRIPTION

Figure 1:
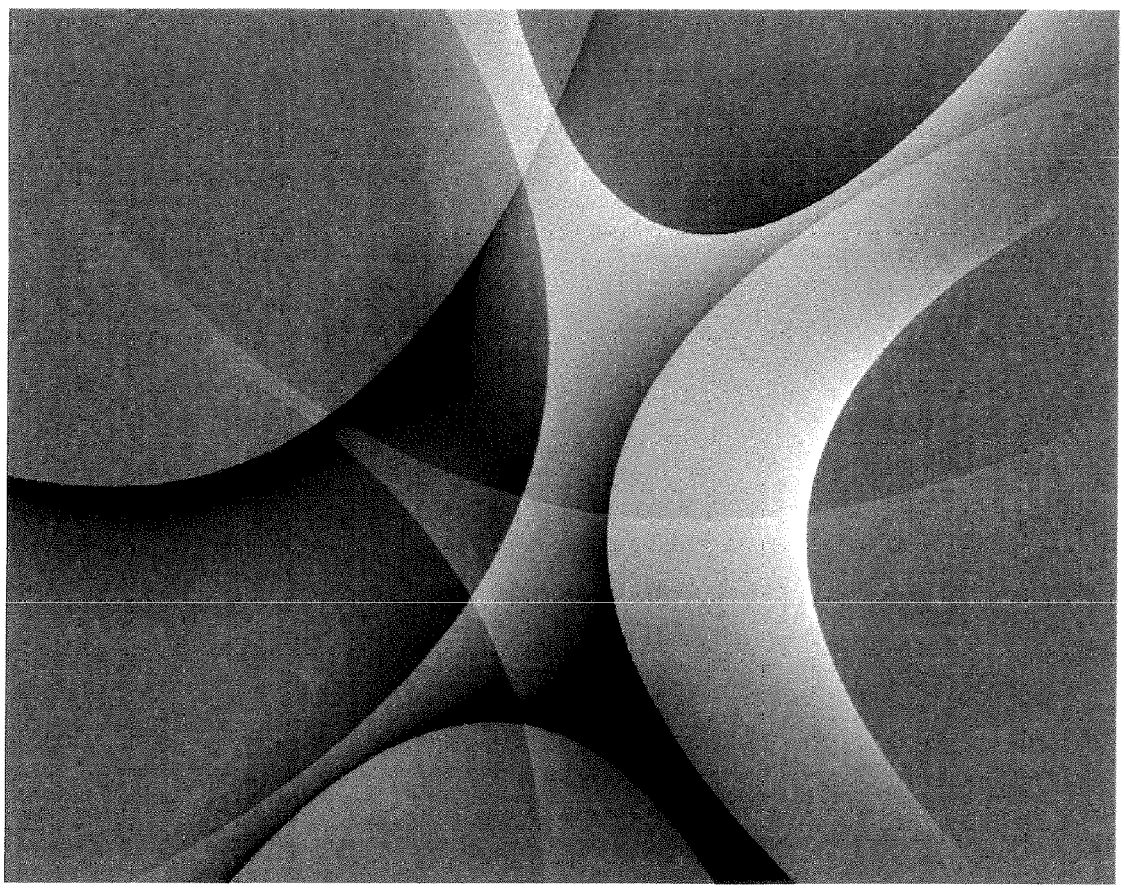
FIG. 1 depicts an exemplary multi-conic gradient, which can be advantageously produced by application of the teachings herein.

A system and method for multi-conic gradient generation are described herein. The following embodiments, described in terms of applications compatible with computer systems manufactured by Apple Computer, Inc. of Cupertino, California, are illustrative only and should not be considered limiting in any respect. The following descriptions are presented to enable any person skilled in the art to make and use the invention as claimed and are provided in the context of the particular examples discussed below, variations of which will be readily apparent to those of ordinary skill in the art. Accordingly, the claims appended hereto are not intended to be limited by the disclosed embodiments, but are to be accorded their widest scope consistent with the principles and features disclosed herein.

Computer systems employing modern programmable graphics processing units (GPUs) in addition to conventional CPU arrangements have the ability to provide solutions to the aforementioned problems. In such systems, the GPU typically resides on a video card. Presently, there are many commercially available programmable GPUs. While both programmable and non-programmable GPUs offer enhanced speed for graphics calculations, programmable GPUs differ in that they offer a high measure of flexibility. In practical terms, programmability is an important advantage because it allows programs to use the graphics chip in ways similar to the system microprocessor. By using the GPU this way, the system can generate virtually limitless graphics effects without loading the system CPU.

In the object-oriented programming context of most modern units (GPUs), there are generally four types of objects available to a programmer: images, filters, contexts, vectors, and textures. An image is generally either the result of rendering (a pixel image) or a representation of the same. A filter is generally high-level functions that are used to affect images. A context is a space, such as a defined place in memory where the result of a filtering operation resides. A vector is a collection of floating point numbers, for example, the four dimensional vector used to describe the appearance of a pixel (red, blue, green and transparency levels). Each of these definitions is somewhat exemplary in nature, and the foregoing definitions should not be considered exclusive or otherwise overly restrictive. Techniques for interacting with these objects are disclosed in Assignee's co-pending patent applications referenced above.

GPU programs may be created in advance by a programmer or may be "just in time" created and compiled by a higher level application. Additionally, although execution speed is typically a high priority, the GPU programs may be stored in any form of solid state memory (such as system RAM or video RAM), optical memory (such as CD-ROM or DVD disks), or magnetic memory (such as hard disks, floppy disks, or magnetic tapes).

A fragment program is a collection of program statements designed to execute on a programmable GPU. The name "fragment" program derives from the fact that the unit of data being operated upon is generally a pixel, i.e., a fragment of an image. Typically, fragment programs specify how to compute a single output pixel based on one or more source pixels. Many instances of such fragments may be run in parallel on the GPU to generate the final output image. Because many pixels are processed in parallel, GPUs can provide dramatically improved image processing capability (e.g., speed) over methods that rely only on a computer system's CPU (which is also responsible for performing other system and application duties). This advantage provides for great speed enhancement of complex graphical manipulations, such as conic generation and evaluation.

To address the aforementioned problems of gradient generation, a set of conics, rendered in the x-y plane may be used as the basis for a gradient image. As noted above, a gradient is a variation of shading in the image plane. For purposes of this disclosure, color is generally a three-component vector (e.g., red, green, blue), but may be replaced by any representation of color (for example, HSV, HSL, CIE L*ab, CMYK, etc). Color may also optionally contain a transparency value, known as "alpha". As used herein, conic or curve refers to a conic section in the standard sense, i.e., a general second order equation in the plane, given by the equation:

$$Ax^2+Bxy+Cy^2+Dx+Ey+F=0$$

The conic gradient system sums a group of conics, for example eight at one time. In a preferred embodiment, the evaluations are performed in a GPU, which generally provides for parallel execution of some number of fragment programs. In any case, the sum of the group of conics is the total intensity. Gradient color is a function of this total intensity, two colors and some noise. Thus, the following describes how to produce a gradient from multiple conics 1. Evaluating the Intensity Value of a Single Conic A single conic is defined as the general second-order equation in the plane, and it provides an intensity value i at each (x, y) point in the plane. The conic is completely characterized by the coefficients A, B, C, D, E, and F (identified above) together with additional coefficients G, H, R, S, T, and U, which are explained below. The intensity of a conic may calculated in the following manner: first, a parameter v may be calculated from the A-F coefficients and the (x, y) coordinate according to the following expression:

$$v=A*x*x+B*x*y+C*y*y+D*x+E*y+F$$

Note that v will equal zero on the line described by the conic coefficients. The value v may then be clamped by a sat(x) function, which is defined as:

$$sat(x)=((x>1)?1:((x<0)?0:x))$$

In other words, the sat(x) function clamps x into the range $0 \leq x \leq 1$, i.e., if x is greater than 1, then x is set equal to 1; if x is less than 0, then x is set equal to 0; if neither of these conditions is true then x is left as is.

So, as noted, the value v may clamped according to the following:

$$v=sat(1+((v<0)?(v*G):(-pow(v,H))))$$

Meaning, v is set equal to sat(1+v*G) if v is less than zero or, if v is not less than zero, v is set equal to sat(1+(-pow(v, H))). The coefficients G and H are additional conic coefficients determined as described below.

A second parameter f may then be calculated according to the following expressions:

$$f=sat(1-abs(R*x+S*y+T));$$

$$f=(3-2*f)*f*f;$$

where R, S, and T are additional conic coefficients determined as described below.

Finally, the intensity may be calculated from the calculated v and f parameters according to the following expression:

$$i=v*f*U;$$

where U is an additional conic coefficient determined as described below. It should be remembered that there is a given intensity value i for each conic at each (x, y) coordinate in the image plane, and thus, in the disclosed embodiment, i is essentially an array of numerical values.

2. Evaluating the Color Value of the Gradient

Once an intensity value for each conic is determined, for example, according to the technique described above, a total intensity t is calculated. This total intensity t is a sum of the individual conic intensities i, and thus the total intensity t is in essence an array having a value at each (x, y) coordinate in the image plane. This total intensity is used to specify the color at each coordinate using the base color, i.e., the background color, and the curve color, i.e., the color of the curve itself. The color for each (x, y) coordinate may then be calculated according to the expression:

$$color=baseColor*(1-t)+curveColor*t$$

When the total intensity is 1 at a given coordinate, the color at that point will be the curve color. When the total intensity is 0 at a given coordinate, the color at that point will be the base color. It should be noted that because the total intensity t is not clamped into the range $0 \leq t \leq 1$, it is possible that the color can exceed that same range. In such a case, the color produced is beyond the range of the two colors. When the color is beyond the range of the two colors (baseColor and curveColor) then its individual components are evaluated regardless of the color components' natural range. For an RGB color, this means that any component of color may be less than 0 or greater than 1.

Once the color is determined a small amount of monochromatic noise is added to eliminate perceived banding in the result image. To effect the addition of random noise, a random number (rand) is multiplied by a parameter (noiseAmount) pre-specified as the amount of noise to add. The random number (rand) lies in the range $-1 \leq rand \leq 1$. (Obviously, rand is reevaluated for each pixel.) Finally, the result is limited (by the "sat" function) to the standard RGB color range. Specifically, the red, green, and blue (RGB) color components are computed in accordance with the following expressions:

$$color.red=sat(color.red+rand*noiseAmount);$$

$$color.green=sat(color.green+rand*noiseAmount);$$

$$color.blue=sat(color.blue+rand*noiseAmount);$$

In an alternative, slightly more complicated, embodiment, the color may be produced by looking in a color table, using some function of the total intensity as an index.

3. Curve Parameters

Each conic that makes up a given gradient may be adjusted in many ways with regard to geometry and color. For example, the geometric shape of each conic can be controlled via the center and the vertex (from geometry). These principles may be used to create a simple graphical interface for moving and adjusting the swath of the conic's gradient. The other adjustments help to provide a rich, expressive environment for specifying complex gradient images. For example, a positive or negative opacity may be used to create positive or negative space (in the art sense).

Mathematically, a given conic is characterized completely by the values of the coefficients A, B, C, D, E, F, G, H, R, S, T, and U identified in the equations above. However, the effect of adjustments of these parameters on the display of a particular conic are not readily apparent to a designer concerned primarily with the aesthetic appearance of the conic. Therefore the following parameters, which are more intuitively related to the appearance of a particular conic, may be defined and presented to a designer. The curve coefficients may then be computed from these parameter values as described in greater detail below. Certain parameters may be better understood with reference to FIG. 2, which is a schematic line drawing of a conic with the various parameters identified.

Figure 2:
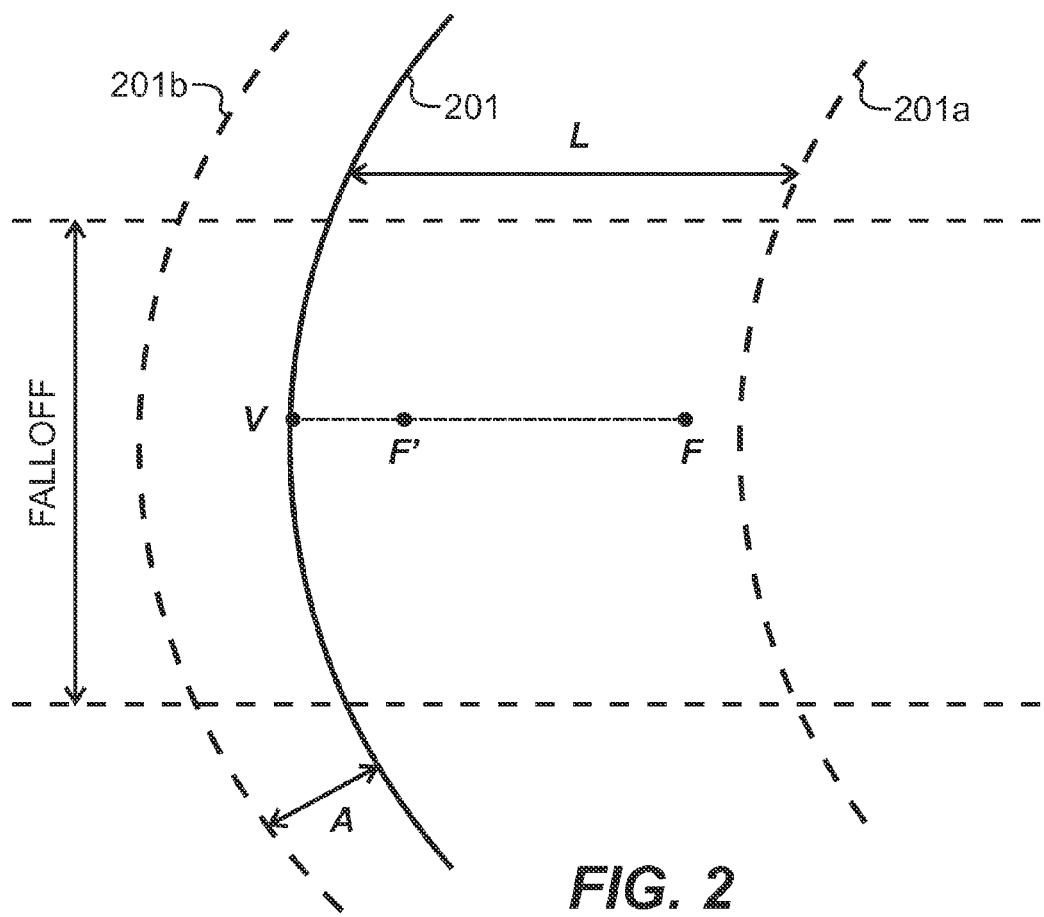
FIG. 2 schematically depicts a single conic gradient along with various parameters used to specify the appearance of the gradient.

A first parameter that is preferably made available to a conic gradient designer is the vertex, denoted V in FIG. 2. The vertex is a point along the conic 201, which is specified by a coordinate, i.e., (x,y), in the plane. The vertex defines a center point of the symmetry of the conic.

A second parameter is the focus, denoted F in FIG. 2. The focus is also specified by a coordinate in the plane, and is a point off the conic. The conic is concave in the direction of the focus. For purposes of a graphical user interface to a conic generation program, the displayed focus, denoted F' in FIG. 2, may actually be substantially closer to the conic than where it actually lies. This is necessary because conics having relatively long radii of curvature would place the true focus well off the display screen. Although the exact relationship between the geometric focus of the conic and the displayed location of the focus can be determined for a given implementation, it has been found that the distance between the displayed focus F' and the vertex V should be proportional to the square root of the distance between the true geometric focus F and the vertex V.

A third parameter of conic shape is the eccentricity. Eccentricity is a scalar value greater than or equal to zero. The eccentricity specifies the particular manifestation of the conic in the plane of the image. As is known from mathematics, a conic, i.e., general second order equation, graphed in a plane will produce either a circle, an ellipse, a parabola, or a hyperbola. In the context of this disclosure, an eccentricity value of 0 corresponds to a circle. Eccentricity values between 0 and 1 correspond to an ellipse, with the ellipse becoming more elongated as the eccentricity approaches 1. An eccentricity value of 1 corresponds to a parabola. Finally, an eccentricity greater than 1 corresponds to a hyperbola, with the hyperbola becoming more pointed as the eccentricity increases. It should be noted that a hyperbola has two distinct parts to the curve, unlike all other conics.

A fourth conic parameter is the length, denoted as L in FIG. 2. The length is a scalar value containing a positive or negative distance. A positive length specifies the maximum distance of gradient shading from the curve in the direction of the focus. (The extent of shading is denoted in FIG. 2 by dashed line 201a.) A negative length specifies the maximum distance of gradient shading from the curve in a direction away from the focus. Positive lengths create apparently convex gradients and negative lengths create apparently concave gradients.

A fifth parameter, closely related to the fourth, is the antialias value, denoted A in FIG. 2. Antialias is also a scalar value containing a distance, which defines the maximum distance of gradient shading from the curve in the opposite direction from that specified by the length. (The extent of shading is denoted in FIG. 2 by dashed line 201b).

Figure 3:
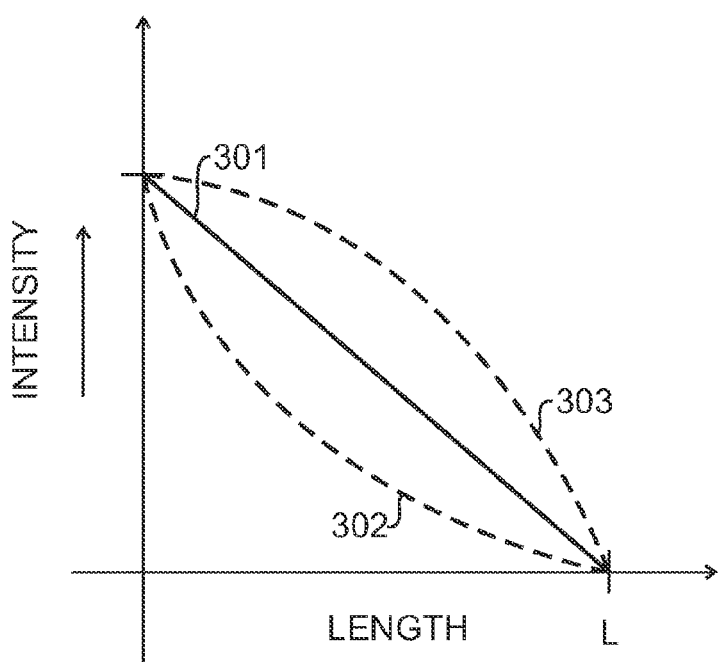
FIG. 3 is a depiction of the attenuation parameter, which specifies the intensity as a function of the distance away from the conic.

A sixth parameter is the attenuation, which may be best understood with reference to FIG. 3. Attenuation is a scalar value used to control the attenuation of gradient shading (specified by the length) as it tends away from the curve. Depending on the value of the attenuation parameter, the shading may fall off linearly moving away from the curve, as illustrated by intensity versus length curve 301. Alternatively, the intensity may fall off rapidly moving away from the conic and then decrease the rate of fall as the length parameter is reached, as illustrated by curve 302. As another alternative, the intensity may fall off less rapidly initially moving away from the conic and then begin to accelerate its rate of decline as it approaches length. Attenuation may thus be one of a continuum of values, defining a family of attenuation curves.

A seventh parameter is the falloff, denoted as falloff in FIG. 2. Falloff is a scalar value containing a distance, and is used to constrain the curve shading in directions perpendicular to the axis of symmetry of the conic. Greater values of falloff will result in a conic that is brighter for a greater distance along the curve. Conversely, smaller values of falloff will result in a conic that maintains its brightness for a shorter distance along the curve.

An eighth parameter is opacity, which is a scalar value that can be either positive or negative. The opacity parameter is used to control the overall intensity of the conic's gradient shading. A negative value means that the gradient forces colors towards the base color (described above). A positive value means that the gradient forces colors towards the curve color (discussed above).

4. Computing the Curve Gradient Coefficients from the Curve Parameters

Once a user specifies the parameters above to define a gradient, it is necessary to convert the specified parameters into the curve gradient coefficients A, B, C, D, E, F, G, H, R, S, T, and U. These coefficients are computed according to the following code fragment:

float A, B, C, D, E, F, G, H, R, S, T, U;

float dx, dy, angle, a, b, c, d, tx, ty, dist, e2, p, t;

$dx$=focus.$x$−vertex.$x$;

$dy$=vertex.$y$−focus.$y$;

dist=$sqrt(dx*dx+dy*dy)$;

$p$=dist *2.0;

// scale parameter for more control $p=p*p*10.0$;

angle=atan2($dy, dx$);

// compute the affine transform for rotating the XY plane into the +X version of the // conic $a$=cos(angle);

$c$=−sin(angle);

$b=-c;$ $d=a;$ $tx=-(a*cx+c*cy);$ $ty=-(b*cx+d*cy);$

// now transform the +X version of the conic y^2=2px−(1−e*e)*x^2

// into the full conic form A*x*x+B*x*y+C*y*y+D*x+E*y+F=0

$e2=1.0-eccentricity*eccentricity;$ $A=b*b+e2*a*a;$ $B=b*d+e2*a*c;$ $C=d*d+e2*c*c;$ $D=b*ty-p*a+e2*a*tx;$ $E=d*ty-p*c+e2*c*tx;$ $F=ty*ty-2.0*p*tx+e2 *tx*tx;$ $B=2.0*B;$ $D=2.0*D;$ $E=2.0*E;$ // compute R, S, and T for the signed distance function from an arbitrary point p and // the line between center and focus (and divide the distance by the falloff to make // calculations easier)

$R=dy/dist;$ $S=dx/dist;$ $T=-R*cx-S*cy;$ $R/=falloff;$ $S/=falloff;$ $T/=falloff;$ $U=opacity;$ $H=log(attenuation)/log(0.5);$ $G=1.0/(antialias*p);$ // factor the length into the curve coefficients, and into the antialias coefficient $t=1.0/(length*p);$ $A*=t;$ $B*=t;$ $C*=t;$ $D*=t;$ $E*=t;$ $F*=t;$ $G/=t;$ When conic evaluation fragment programs as described herein are implemented in a computer system having access to a typical GPU, the conics are easy to evaluate. In one embodiment, it is possible to evaluate four or eight conics simultaneously in a one-pass fragment program by exploiting the multi-element vector capabilities of a typical GPU. Given current hardware capabilities, this provides a frame rate greater than 60 frames per second on even the largest screens (i.e., more pixels). This capability enables animation of the gradients, because the parameters of the curves may be continuously varied as a function of time, giving a smooth animation effect.

Implementation of the gradient formation algorithms described herein may take place in a variety of forms. In one embodiment, a graphical front end interface may be created that allows a designer to manipulate the various curve parameters and see the results rendered in real time. This graphical interface may provide the capability both to enter particular values for parameters, or to click and drag various handles on the curves corresponding to parameters such as vertex, focus, and length so as to provide a highly interactive environment. In yet another embodiment, a computer operating system may be designed to use such gradients as a desktop image and/or screensaver, and these desktops and screensavers may be animated in accordance with the principles described above.

4. An Exemplary System for Computing Gradients

Figure 4:
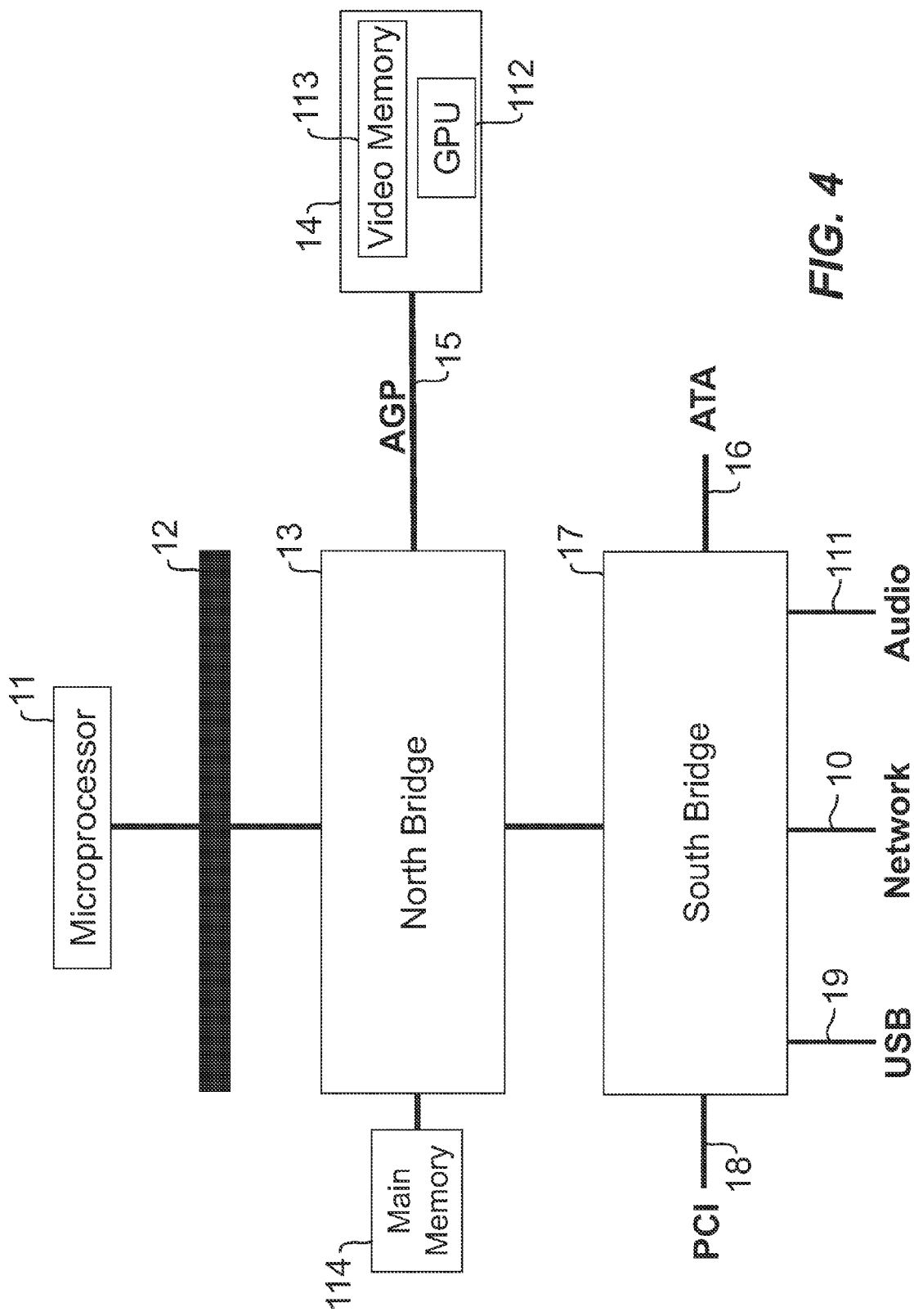
FIG. 4 is an exemplary hardware configuration according to one disclosed embodiment.

Referring to FIG. 4, an exemplary hardware configuration is shown. Very generally, a microprocessor 11 is coupled to chipset support integrated circuits 13 and 17. The microprocessor may be any microprocessor or controller such as one of the Intel Pentium family or IBM/Motorola PowerPC family. The chipset ICs (expressed here as North Bridge 13 and South Bridge 17) may be implemented in one or more ICs (integrated circuits). The chipset 13, 17 generally couples to the microprocessor through a bus 12 or by direct links, which are well known in the art. If the chipset 13, 17 is implemented in more than one IC, it is common for North Bridge functionality (AGP, memory management, etc.) to have a more direct connection to the processor by either connection to a common bus or the aforementioned links A separate chip containing the South Bridge functionality is very commonly coupled to the microprocessor 11 through the North Bridge. However, other configurations that exist now or may exist in the future may also be used in accordance with the system described herein.

Some potential South Bridge functionality includes an ATA bus 16 for peripheral attachments such as disk drives, a PCI bus 18 for attachment of all manner of peripherals, a USB controller 19 for attachment of USB devices, a network interface controller 110 for supporting Ethernet or potentially other networks, and audio support 111. More relevantly, typical North Bridge functionality includes a memory controller to support main memory 114 and an accelerated graphics port (AGP) 15 for support of a video subsystem. Memory is typically any of a variety of types of dynamic random access memory, but may also, in alternative configurations be static RAM, magnetic memory, optical memory or any other suitable storage medium that exists or may exist in the future.

AGP 15 is a special port placed in the chipset so that the graphics subsystem has rapid access to the system resources such as the microprocessor and main memory. There are various emerging flavors of AGP and certainly other methods to accelerate the speed of interaction between core resources and the graphics subsystem. This discussion is not intended to limit use to any particular method for performing similar functions.

These and many other embodiments of the gradient calculation techniques and computer systems on which such techniques are beneficially applied would be within the abilities of one skilled in the art having the benefit of this disclosure and the relevant incorporated references. Thus, while the invention has been disclosed with respect to a limited number of embodiments, numerous modifications and variations will be appreciated by those skilled in the art. It is intended that all such variations and modifications fall with in the scope of the following claims.

What is claimed is:

1. A method of producing an image comprising a plurality of pixels from one or more functions executed and applied to at least some of the plurality of pixels by one or more processing units, the method comprising:
   evaluating a value of each of the one or more functions for each pixel of the image on the one or more processing units; and
   determining, on the one or more processing units, at least one of an intensity value and a color value for each pixel by combining two or more of the evaluated values.

2. The method of claim 1 further comprising displaying the image.

3. The method of claim 1 wherein the one or more functions is specified by a user.

4. The method of claim 1 wherein the function is a polynomial.

5. The method of claim 4 wherein the polynomial is a second order polynomial.

6. The method of claim 5 wherein the second order polynomial is a conic.

7. The method of claim 1 wherein combining two or more of the evaluated values comprises addition of the two or more evaluated values.

8. The method of claim 1 wherein determining the color value for each pixel further comprises adding random noise to the color value to eliminate banding.

9. The method of claim 1 wherein evaluating a value of each of the one or more functions comprises simultaneously evaluating a plurality of functions.

10. A method of producing an animated image representation in memory communicatively coupled to one or more processing units comprising a sequence of frames, wherein each frame comprises an image computed by the one or more processing units according to claim 1 and wherein one or more parameters of the one or more functions is varied from frame to frame.

11. The method of claim 10 further comprising displaying the sequence of frames.

12. The method of claim 10 wherein the one or more functions is specified by a user.

13. The method of claim 10 wherein the function is a polynomial.

14. The method of claim 13 wherein the polynomial is a second order polynomial.

15. The method of claim 14 wherein the second order polynomial is a conic.

16. The method of claim 10 wherein combining two or more of the evaluated values comprises addition of the two or more evaluated values.

17. The method of claim 10 wherein determining the color value for each pixel further comprises adding random noise to the color value to eliminate banding.

18. The method of claim 10 wherein evaluating a value comprises simultaneously executing a plurality of functions.

19. A computer readable storage medium, having embodied thereon machine executable instructions for performing a method according to claim 1.

20. A computer system comprising a central processing unit and a programmable graphics processing unit, wherein the graphics processing unit is programmed to perform a method according to claim 1.

* * * * *

UNITED STATES PATENT AND TRADEMARK OFFICE
CERTIFICATE OF CORRECTION

| | | |
|---|---|---|
| PATENT NO. | : 7,782,337 B1 | Page 1 of 1 |
| APPLICATION NO. | : 11/862547 | |
| DATED | : August 24, 2010 | |
| INVENTOR(S) | : Mark Zimmer et al. | |

It is certified that error appears in the above-identified patent and that said Letters Patent is hereby corrected as shown below:

In column 1, line 13-14, delete "10/826,773 , filed" and insert -- 10/826,773, filed --, therefor.

In column 3, line 42, delete "conics" and insert -- conics. --, therefor.

In column 8, line 44, delete "links" and insert -- links. --, therefor.

Signed and Sealed this
Twenty-second Day of November, 2011

David J. Kappos
*Director of the United States Patent and Trademark Office*